United States Patent
Kranzley et al.

(10) Patent No.: US 7,983,987 B2
(45) Date of Patent: Jul. 19, 2011

(54) SYSTEM AND METHOD FOR CONDUCTING SECURE PAYMENT TRANSACTION

(75) Inventors: Arthur D. Kranzley, Pound Ridge, NY (US); Stephen W. Orfei, Katonah, NY (US); Bruce J. Rutherford, Stamford, CT (US)

(73) Assignee: MasterCard International Incorporated, Purchase, NY (US)

( * ) Notice: Subject to any disclaimer, the term of this patent is extended or adjusted under 35 U.S.C. 154(b) by 877 days.

(21) Appl. No.: 10/502,844

(22) PCT Filed: Jan. 30, 2003

(86) PCT No.: PCT/US03/02817
§ 371 (c)(1),
(2), (4) Date: Jun. 13, 2005

(87) PCT Pub. No.: WO03/065164
PCT Pub. Date: Aug. 7, 2003

(65) Prior Publication Data
US 2005/0240522 A1 Oct. 27, 2005

Related U.S. Application Data

(63) Continuation-in-part of application No. 10/096,271, filed on Mar. 11, 2002.

(60) Provisional application No. 60/352,968, filed on Jan. 30, 2002.

(51) Int. Cl.
*G06Q 40/00* (2006.01)

(52) U.S. Cl. ............. 705/44; 705/26; 705/41; 705/52; 705/59; 705/64; 380/283

(58) Field of Classification Search ............. 704/1–59; 705/26, 41, 44, 51, 59, 64; 380/283
See application file for complete search history.

(56) References Cited

U.S. PATENT DOCUMENTS

| | | | | |
|---|---|---|---|---|
| 5,757,917 A * | 5/1998 | Rose et al. | | 705/79 |
| 5,826,241 A * | 10/1998 | Stein et al. | | 705/26 |
| 6,016,484 A | 1/2000 | Williams et al. | | 705/39 |
| 6,128,391 A * | 10/2000 | Denno et al. | | 380/283 |
| 6,317,729 B1 * | 11/2001 | Camp et al. | | 705/79 |
| 6,327,578 B1 * | 12/2001 | Linehan | | 705/65 |
| 6,895,391 B1 * | 5/2005 | Kausik | | 705/50 |
| 7,103,570 B1 * | 9/2006 | Morea et al. | | 705/38 |
| 7,103,575 B1 * | 9/2006 | Linehan | | 705/64 |
| 7,165,174 B1 * | 1/2007 | Ginter et al. | | 713/153 |
| 7,330,836 B2 * | 2/2008 | Kausik | | 705/50 |
| 2001/0029485 A1 | 10/2001 | Brody et al. | | |
| 2001/0034720 A1 * | 10/2001 | Armes | | 705/65 |
| 2002/0065774 A1 * | 5/2002 | Young et al. | | 705/41 |
| 2002/0138450 A1 * | 9/2002 | Kremer | | 705/75 |
| 2003/0126064 A1 * | 7/2003 | Foran et al. | | 705/37 |
| 2004/0158532 A1 * | 8/2004 | Breck et al. | | 705/74 |
| 2004/0260653 A1 * | 12/2004 | Tsuei et al. | | 705/54 |
| 2006/0259388 A1 * | 11/2006 | Morea et al. | | 705/35 |
| 2008/0052244 A1 * | 2/2008 | Tsuei et al. | | 705/74 |

\* cited by examiner

*Primary Examiner* — Pierre Eddy Elisca
*Assistant Examiner* — Shahid Kamal
(74) *Attorney, Agent, or Firm* — Baker Botts L.L.P.

(57) ABSTRACT

In a secure electronic payment system, authentication data based on a payment account (e.g., a credit card account) is sent from an authentication server, through a user's Web browser, to a merchant's computer. The merchant's computer sends the authentication data to a computer operated by the issuer of the payment account, either through a payment organization computer or through an acquirer computer operated by the merchant's acquirer. The issuer's computer verifies the authorization request message, thereby generating an authorization response message. The authorization response message is forwarded to the merchant's computer, either through the payment organization computer or through the acquirer computer. If the authorization response message indicates that the verification was successful, the transaction is completed.

18 Claims, 9 Drawing Sheets

SYSTEM AND METHOD FOR CONDUCTING SECURE PAYMENT TRANSACTION

CROSS-REFERENCE TO RELATED APPLICATIONS

This application is a continuation-in-part of U.S. patent application Ser. No. 10/096,271, entitled "System and Method for Conducting Secure Payment Transactions," filed on Mar. 11, 2002, which is incorporated herein by reference in its entirety; this application also claims priority to the following additional application which is incorporated herein by reference in its entirety: U.S. Provisional Patent Application No. 60/352,968, entitled "MasterCard UCAF™ and SPA™ Clientless Solution," filed on Jan. 30, 2002.

BACKGROUND OF THE INVENTION

On-line shopping offers unprecedented ease and convenience for consumers, while enabling merchants to reduce costs and obtain new customers. However, many consumers have been reluctant to take advantage of these benefits due to fear of theft of sensitive information such as credit card numbers. Efforts have been made to increase the security of such information. For example, in the secure socket layer (SSL) technique, messages sent between the consumer and the merchant are encrypted, thereby making it more difficult for a third party to intercept and use the information. However, this method does not provide the merchant with any verification of the identity of the consumer. Accordingly, if a third party were to obtain a credit card number by other fraudulent means such as theft of physical credit card, the SSL method would not prevent the third party from fraudulently using the stolen information.

Secure Electronic Transaction (SET™) techniques attempt to solve the foregoing problems by using digital certificates to authenticate the consumer/account holder, the merchant, and the credit card issuer. Each certificate is issued by a trusted certificate authority. While SET™ is currently the most secure way to handle payments over the Internet, it requires digital certificates and cryptographic software to be installed and operated on the account holder's computer.

In fact, most prior art secure electronic commerce systems require consumers to install special software on their computers. Yet, many consumers are reluctant to install such software and, in any case, a specialized account holder application may not be compatible with a wide variety of account holder access devices—e.g., personal computers, personal digital assistants, and mobile communication devices such as mobile telephones. As a result, it has been difficult for some secure electronic commerce systems to gain widespread acceptance among consumers.

SUMMARY OF THE INVENTION

It is therefore an object of the present invention to provide a payment system which enables a consumer to make on-line purchases without compromising sensitive information such as the consumer's account number.

It is an additional object of the present invention to provide a payment system in which the identity of a consumer is authenticated without requiring the issuance of a large number of digital certificates.

It is still a further object of the present invention to provide a payment system in which information security is maintained and the identities of on-line consumers are authenticated, without requiring consumers to download large software files, and without employing computationally intensive calculations which might slow down the consumer's computer.

It is yet another object of the present invention to provide a payment system compatible with a wide variety of different account holder access devices.

These and other objects are accomplished by a method and system for conducting an online payment transaction, in which authentication data is sent from an authentication processor (e.g., a computer operated by a payment organization) to a user processor (typically a purchaser's computer), then to a merchant's processor, then to an acquirer processor or the payment organization processor, and then to an issuer processor (typically, a computer operated by the issuer of the purchaser's credit/debit card account or other payment account) for verification. The result of the verification is sent back to the merchant processor through the payment organization processor or the acquirer processor, whereupon the merchant processor either denies or completes the transaction. To generate the authentication data, the user processor sends payment account identification data (e.g., a credit card or debit card number) to the merchant processor, which sends an account holder participation request message to a registration database processor to determine whether the payment account is listed in a registration database. If the payment account is listed, the registration database sends a URL through the merchant processor which passes the URL on to the user processor. The user processor uses a Web browser to access a credential collection page provided by the payment organization. The user processor fills in the credential collection page and sends an authentication request message to the authentication processor, which authenticates the data and, if the authentication is successful, provides the aforementioned authentication data.

BRIEF DESCRIPTION OF THE DRAWINGS

Further objects, features, and advantages of the present invention will become apparent from the following detailed description taken in conjunction with the accompanying figures showing illustrative embodiments of the invention, in which.

Throughout the figures, unless otherwise stated, the same reference numerals and characters are used to denote like features, elements, components, or portions of the illustrated embodiments.

DETAILED DESCRIPTION OF THE INVENTION

Figure 1:
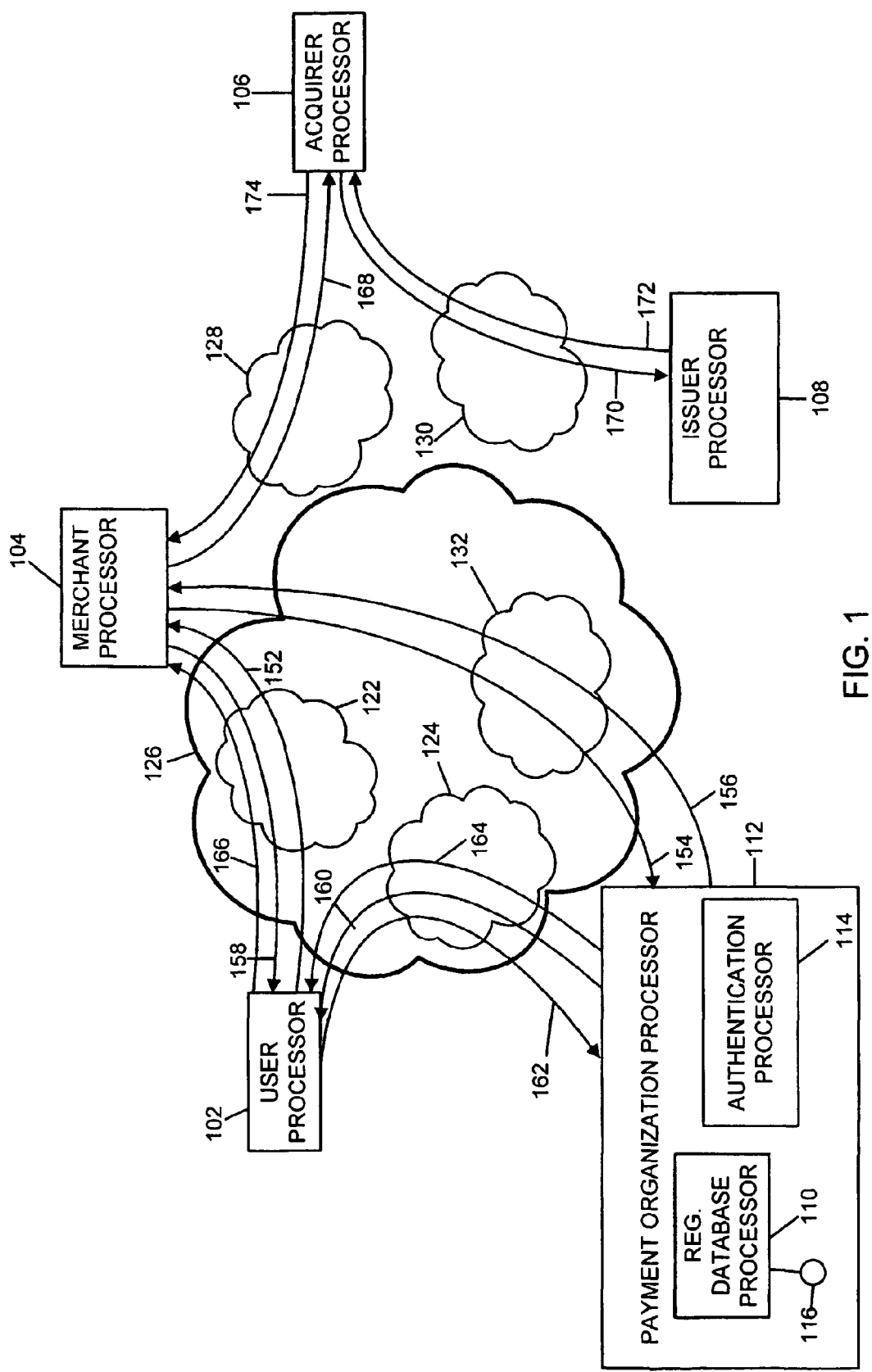
FIG. 1 is a block diagram illustrating an exemplary system for conducting a payment transaction in accordance with the present invention.

FIG. 1 illustrates an exemplary system for performing secure payment transactions in accordance with the present invention. The system includes a user processor 102 operated by user and running user software (typically, a Web browser), a merchant processor 104 operated by a merchant selling goods and/or services, an acquirer processor 106 operated by an acquirer—typically the merchant's acquiring bank—and an issuer processor 108 operated by an issuer—typically a financial institution such as a bank—that has issued a payment account being used to conduct a transaction with the merchant. The system further includes a registration database processor 110 and an authentication processor 114 which can be separate computers, but which are more typically implemented as portions of the software of a payment organization processor 112. The payment organization processor 112 is operated by a payment organization such as the MasterCard® payment organization and is preferably a server computer connected to a network 126 such as the Internet. The user processor 102 typically is, or is included in, an access device such as, for example, a computer, a personal digital assistant (PDA), or a mobile telephone. Preferably, the user processor 102 runs a Web browser which supports name-based addressing of Web page fields, in order to enable identification of hidden and visible fields using names which are uniform for multiple merchants and account holders. The price(s) of the good(s) and/or service(s) being purchased are charged to a payment account of an account holder. The payment account is typically a credit card account, a debit card account, and/or any other type of payment card account. The account can, but need not be, associated with a physical card. For example, the payment account can be associated with a virtual card which can be stored electronically in the user processor 102. The purchaser can, but need not be, the account holder. The system uses authentication data 164 which effectively travels from the authentication processor 114 to the user processor 102, then to the merchant processor 104, then to the acquirer processor 106, and then to the issuer processor 108 for verification. The data 170 ultimately received by the issuer processor 108 should match the authentication data 164 originally generated by the authentication processor 114, provided that no improper operations have been performed upon the data 164 during its trip through the system. The authentication processor 114 and the issuer processor 108 share all necessary information regarding the authentication data 164, thereby allowing the issuer processor 108 to verify the data 170 upon receipt. The issuer processor 108 can thus authenticate the identity of the account holder and verify the authenticity of the transaction based upon the authentication data 164 sent by the authentication processor 114 and the data 170 received by the issuer processor 108. The payment organization typically operates not only the payment organization processor 112, but also the registration database processor 110 and the authentication processor 114. However, in some cases, the authentication processor 114 is operated by the issuer.

Figure 8:
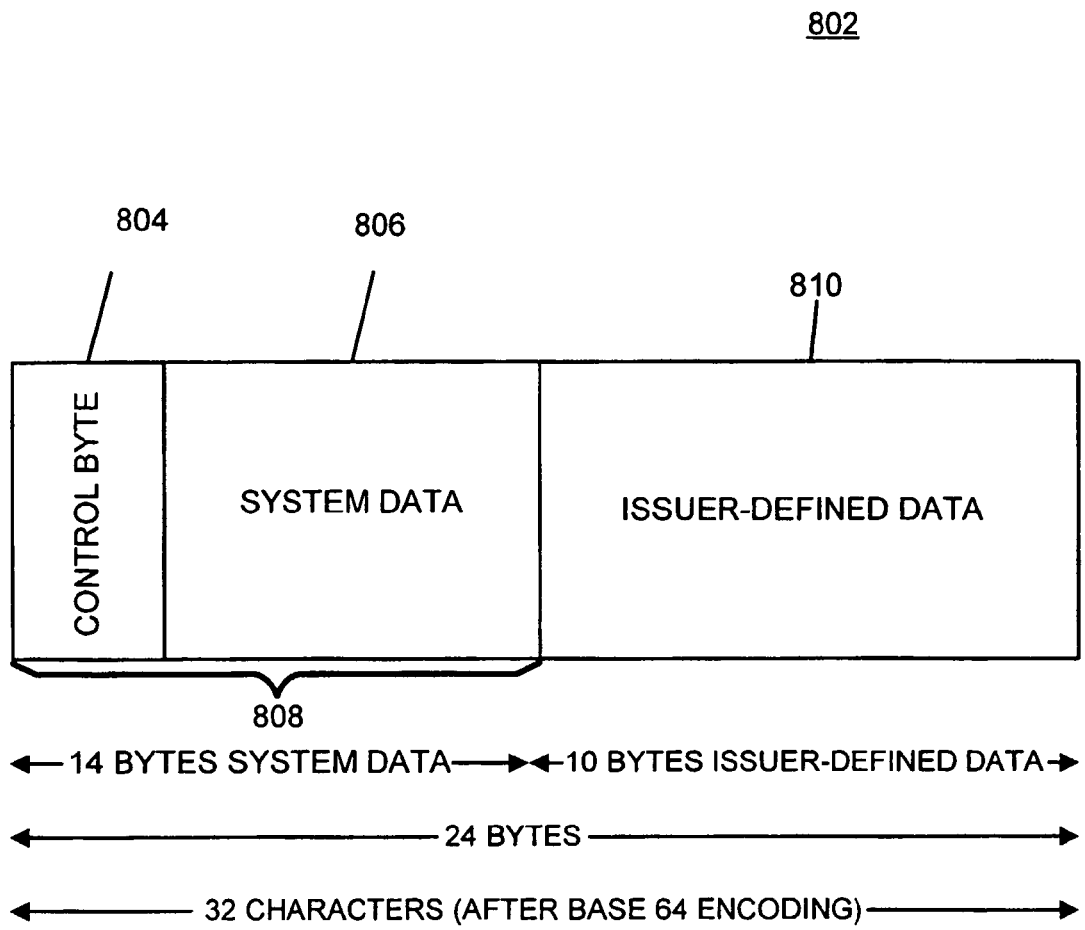
FIG. 8 is a block diagram illustrating an exemplary account holder authentication value (AAV) in accordance with the present invention.

FIG. 8 illustrates an example of a data structure 802—referred to herein as an Account Holder Authentication Value (AAV)—which can be used as the authentication data 164 illustrated in FIG. 1. The AAV 802 comprises 24 bytes of binary data representing 32 Base-64-encoded characters. The first 14 bytes 808 can generally be referred to as system data, and include a control byte 804 and other system data 806. The remaining 10 bytes 810 of data are defined by the issuer. The control byte 804 provides information regarding the type of authorization being performed. For example, the control byte 804 has a hexadecimal value of "82" for an initial authorization or pre-authorization of account holder, and a value of "02" for subsequent authorizations of the account holder. Additional authentication approaches are assigned their own control byte values. For example, a biometrics-based authentication procedure would have its own value for the control byte 804. Table I describes the various portions of the AAV 802.

TABLE I

| # | Data Element | Length | Data Description |
|---|---|---|---|
| 1 | Control Byte 804 | 1 Byte | Value = hexadecimal "82" indicates initial AAV<br>Value = hexadecimal "02" indicates subsequent AAV |
| 2 | Sale Amount | 2 Bytes | Consists of the left-most 4 decimal digits of the 12-digit sale amount with up to eight leading zeroes deleted. For example if the 12-digit transaction amount presented by the merchant consists of 000008765432, the four digits are 8765. |
| 3 | Sale Amount Truncation Field | 4 Bits | The above process for filling in the Sale Amount data can exclude some of the right-most digits of the original 12-digit amount. This field indicates how many such digits are so excluded. For example, if the 12-digit transaction amount consists of 000008765432, so that the four selected digits are 8765, then the three right-most digits of "432" would be excluded. In this case the Truncation Field would contain the value "3". |
| 4 | Transaction Currency Code | 12 Bits | Consists of the 3 decimal digit ISO 4217 currency code as included by the merchant in its payment page through a hidden field. Convert the three decimal digit Currency Code to binary, right-justify the resulting 10 bits in a 12 bit field, padded to the left with binary "00". |

TABLE I-continued

| # | Data Element | Length | Data Description |
|---|---|---|---|
| 5 | SHA-1 hash of Merchant Name | 7 Bytes | Consists of the left-most 7 bytes of the SHA-1 hash of the Merchant Name included by the merchant in the hidden field on its payment page. Merchant Name can first be edited as discussed below. |
| 6 | Merchant Transaction Stamp (MTS) | 2 Bytes | A number generated by the merchant. If this hidden field has a hexadecimal value of "00 00," this indicates that a random number has not been generated. |
| 7 | Issuer-defined Data 810 | 10 Bytes | Contains issuer-generated account holder authentication data. Preferably these data uniquely relate the transaction to the account holder. |

As is indicated in Table I, data element no. 1, a/k/a the control byte 804, is set to hexadecimal "82" for all AAVs associated with initial authorizations, including pre-authorizations. Elements 2-6 are the system data 806, which are transaction-specific details provided by the merchant's Web site. Element number 7 comprises the issuer-defined data 810. This element contains data that links the account holder to the particular transaction.

The system data 806 and the issuer-defined data 810 of the AAV 802 are generated and linked to a particular payment account by the authentication processor 114. Upon receiving a request 162 for authentication of an account holder's identity, the authentication processor 114 generates the system data 806 and the issuer-defined data 810 in binary format. The two sets of data 806 and 810, along with the control byte 804, are combined to form a 24-byte binary version of the 802. Base 64 encoding of the 24-byte binary version produces a 32-character, Base 64 version of the AAV 802.

The system data 806 are created based on the control byte 804 and on information supplied from the merchant's confirmation page. The data 806 are generated using the following procedure:

1. A control byte 804 is created for the AAV 802. The control byte 804 can be, for example, a binary-coded decimal representation of the hexadecimal value "82."
2. The Sale Amount is created by the following steps:
    a. Up to 8 leading zeros are deleted from the Sale Amount
    b. The first four remaining Sale Amount digits are placed in the Sale Amount field as 4 binary coded digits.
3. The number of right-most digits of the Sale Amount that were excluded in Step 2b is determined. This number, which is a single, binary-coded decimal digit, is placed in the Sale Amount Truncation Field.
4. The 3-digit decimal Currency Code is converted to binary, and the resulting 10 bits are right-justified in a 12 bit field and padded to the left with binary "00."
5. The Merchant Name, which is represented by a set of hexadecimal Unicode control values, is edited using the following rules, but only if the name is expressed as a Latin-1 character set. All other character sets require no editing.
    a. All Latin-1 control characters are deleted. These are Unicode characters in the hexadecimal range 0000 through 001F, and 007F through 009F.
    b. With the exception of "&" (hexadecimal 0026), "@" (hexadecimal 0040), "¼" (hexadecimal 00BC), "½" (hexadecimal 008D), and "¾" (hexadecimal 00BE), any remaining Latin-1 non-alphanumeric character is replaced with a space character (hexadecimal 0020). The Unicode non-control and non-alphanumeric characters are those in the sets 0021 through 002F, 003A through 0040, 005B through 0060, 007B through 007E, 00A0 through 00BF, 00D7, and 00F7.
    c. Any character in the General Punctuation character set (2000 through 206F) is replaced with a space character (0020).
    d. Any Latin-1 numeric digits (0030) through (0039) beyond the third such digit are deleted so as to include only the first three numeric digits in the Merchant Name.
    e. After completion of the prior steps (a) through (d), all consecutive space characters (0020) are replaced with a single space character (0020).
    f. After completion of all prior steps, all leading and trailing space characters are deleted.
6. An SHA-1 hash of the edited (or unedited) Merchant Name is created and used to fill data element no. 5 listed in Table I.
7. The MTS from the merchant's payment screen is inserted into the MTS field as a binary coded decimal.

The resulting 14-byte binary value is the system data 806 which will be combined with the issuer-defined data 810 and then Base 64 encoded to create the AAV 802.

The procedure used to generate the issuer-defined data 810 depends on the approach that will ultimately be used to verify the AAV 802. For example, in a cryptographic approach, the issuer-defined data element 810 is generated by encrypting a number, text string, or other data selected by the issuer. For example, the data to be encrypted can be a concatenation of the merchant name, the transaction amount, the date, and the account number of the account being used to make the purchase. The data is encrypted using a secret key—discussed in further detail below—to generate a cryptographic Message Authentication Code (MAC). Preferably, the MAC is generated by an ISO-approved encryption algorithm. The MAC is incorporated into the issuer-defined data 810 which is combined with the system data element 804 and 806 to form the AAV 802. During authorization, the issuer processor 108 cryptographically verifies the issuer-defined data element 810 to verify its authenticity. The cryptographic approach is particularly beneficial for systems in which the AAV 802 is created by one facility and verified by a different facility, wherein the two facilities are not in real-time communication. For the cryptographic approach, the issuer-defined data 810 in the AAV 802 includes the data elements described in Table II.

TABLE II

| Data Type | Description |
|---|---|
| AAV Format Number | Indicates the format of the issuer-defined data 810. |
| Authentication Processor Identifier | If this issuer uses multiple authentication processors, this is an indication of which processor produced this AAV. |
| Key Identification Data | Used to identify the cryptographic key used by this authentication processor to generate the AAV MAC. |

TABLE II-continued

| Data Type | Description |
| --- | --- |
| Transaction Sequence Number | A unique number assigned to this AAV by this authentication processor. It should not repeat during the longest expected life of any transaction. |
| Message Authentication Code (MAC) | A MAC generated using the above-identified key by the above-identified authentication processor, and based on the transaction's account number and on the entire AAV up to the MAC field. It must use an ISO-approved MAC algorithm. |

Since the issuer-defined data 810 is limited to 10 binary bytes, it may be sufficient to include only a portion of each of the above data elements. Preferably, the data 810 include four bytes of the MAC, four bytes of the Transaction Sequence Number, one byte of the Key Identification Data, and one byte total from the combination of the AAV Format Indicator and the Authentication Processor Identifier.

The MAC serves as a cryptographic check to detect fraudulent alteration. Both the authentication processor 114 generating the MAC and the issuer processor 108 used to verify the transaction have access to the secret cryptographic key used to generate the MAC.

The authentication processor 114 performs the following steps for each transaction:

8. The following AAV data elements are created: AAV Format Number, Authentication Processor Identifier and Key Identification Data.
9. The Transaction Sequence Number used in the previous AAV is incremented by a predetermined amount selected by the issuer. One or more of the right-most bits of the incremented value are used as the AAV Transaction Sequence Number data element.
10. Using the key indicated by Key Identification Data, a MAC is created by concatenating and encrypting the following data: (1) the account number provided to the merchant, (2) the entire AAV excluding the MAC subfield itself, and (3) any other issuer-selected data. The left-most portion of the cryptographically computed MAC is issued as the AAV MAC data element.

In the cryptographic approach, the issuer processor 108 determines the secret cryptographic key used by the authentication processor 114 to generate the MAC. Preferably, the two processors 114 and 108 share a secret, cryptographic Key-Generation Key from which many (hundreds, thousands, or even millions) of MAC-generation keys can be derived. The Key-Generation Key can be used for years, whereas the MAC-Generation Key is preferably changed relatively frequently, depending upon the requirements of the MAC-generation algorithm and the issuer's key-management policy. In any case, however, the Key-Generation Key should be changed if there is any suspicion that it has been compromised.

The shared Key-Generation Key can, for example, be created by the issuer processor 108 and conveyed to the authentication processor 114 as one or more key components, using multiple control (preferably triple control) and split knowledge. The generation and distribution of cryptographic keys should conform to ISO security standards. Similarly, the mechanism by which a MAC-Generation Key is derived from a Key-Generation Key should also conform to ISO security standards. Furthermore, any cryptographic key stored within a storage medium connected to an authentication processor 114 or to an issuer processor 108 preferably resides solely within physically secure hardware that protects the key against physical compromise in accordance with ISO standards.

If an issuer processor 108 receives AAVs from more than one authentication processor, then any cryptographic key that the issuer processor 108 shares with one authentication processor should not be related to any key it shares with another authentication processor.

The following is an example of cryptographic generation of an AAV for an initial transaction:
Initial Authorization Transaction Example Data:
Control Byte Value: 82
Sale Amount: $87654.32
Currency Code: 840
Merchant Name (Unicode representation of SPA Merchant, Inc.):
0053 0050 0041 0020 004D 0065 0072 0063 0068 0061 006E 0074 002C 0020 0049 006E 0063 002E
MTS: FOB
Issuer-defined data: 55390900400486471234
SHA-1 hash of merchant name (after editing as described above)=31 98 BE 30 1F BD 74 0F E2 AD 7E D2 ED 82 9E 69 06 EC E3 6F
Would Result in 24 Binary Byte Source:
82 87 65 38 40 31 98 BE 30 1F BD 74 F0 AB 55 39 09 00 40 04 86 47 12 34
Converts to 32 Character Base 64 Encoded String:
godIOEAxmL4wH7108KtVOQkAQASHRxI0
The details for this example are as follows:

```
Map:     AAAAAAAABBBBBBBBBBBBBBBBCCCCDDDDDDDDDDDD
Source:    0    2    8    7    6    5    3    8    4    0
Binary:  1000001010000111011001010011100001000000
6-Bit:
word:      00   40   29   37   14   04
Base64:    A    0    d    1    0    E Map:
         EEEEEEEEEEEEEEEEEEEEEEEEEEEEEEEEEEEEEEEEEEEEEEEEFFFFFFFFFFFFFFFF
Source:    3    1    9    8    B    E    3    0    1    F    B    D    7    4    F    0    A    B
Binary:
         001100010011000101111100011000000011111101111010111010011110000101010011
6-Bit:
word:      00   49   38   11   56   48   07   59   53   52   60   10
Base64:    A    x    m    L    4    w    H    7    1    0    8    K Map:     GGGGGGGGGGGGGGGGGGGGGGGGGGGGGGGGGGGGGGGG
Source:    5    5    3    9    0    9    0    0    4    0
Binary:  0101010100111001000010010000000001000000
6-Bit:
word:      45   21   14   16   36   00   16
```

```
                         -continued
Base64:    t    V    0    0    k    A    Q Map:       GGGGGGGGGGGGGGGGGGGGGGGGGGGGGGGGGG
Source:    0    4    8    6    4    7    1    2    3    4
Binary:    00000100100001100100011100010010001101 00
6-Bit:
word:      00       18       07       17       49       08       52
Base64:    A        S        H        R        x        I        0
Result:
24 byteSource: 82 87 65 38 40 31 98 BE 30 1F BD 74 F0 AB 55 39 09 00 40 04 86 47 12 34
Converts to 32 character Base 64 encoded string: godIOEAxmL4wH71OBKtVOQkAQASHRxIO
```

The following is an example of cryptographic generation of an AAV for a subsequent transaction:
Subsequent Transaction Example Date:
Control Byte Value: 82
Sale Amount: $87654.32
Currency Code: 840
Merchant Name (Unicode representation of SPA Merchant, Inc.):
0053 0050 0041 0020 004D 0065 0072 0063 0068 0061 006E 0074 002C 0020 0049 006E 0063 002E
MTS: F0AB
Issuer-defined data: 55390900400486471234
SHA-1 hash of merchant name (after editing as described above)=31 98 BE 30 1F BD 74 0F E2 AD 7E D2 ED 82 9E 69 06 EC E3 6F
Would Result in 24 binary byte Source: 02 87 65 38 40 31 98 BE 30 1F BD 74 F0 AB 55 39 09 00 40 04 86 47 12 34
Converts to 32 Character Base 64 Encoded String: AodIOEAxmL4wH7108KtVOQkAQASHRI0
The details for this example are as follows:

A comparative approach is preferred for systems in which the AAV creation and verification facilities—the authentication processor 114 and the issuer processor 108, respectively—are in real-time communication with each other—e.g., via a common data storage system. In the comparative approach, the issuer-defined data 810 are generated using a random number or any other algorithm selected by the issuer. The resulting value 810 is combined with the system data 806 to form the AAV 802. The AAV 802 is then saved to a common database that is used by the issuer processor 108 to verify transaction authenticity. During verification, the issuer processor 108 verifies the authenticity of a transaction by comparing the AAV received in the authorization request 170 to the AAV stored in the database. The AAV for the comparative approach is generated and stored according to the following procedure:

11. Generate the issuer-defined data 810 in accordance with the issuer's definition—e.g., by a random number generator.
12. The issuer-defined data 810 are stored in a database linking them at least to a particular Account Number.

```
Map:       AAAAAAABBBBBBBBBBBBBBBBBBCCCCDDDDDDDDDDDD
Source:    8    2    8    7    6    5    3    8    4    0
Binary:    1000001010000111011001010011100001000000
6-Bit:
word:         32       40       29       37       14       04
Base64:       g        o        d        1        0        E
Map:
           EEEEEEEEEEEEEEEEEEEEEEEEEEEEEEEEEEEEEEEEEEEEEEEEEFFFFFFFFFFFFFFFF
Source:    3    1    9    8    B    E    3    0    1    F    B    D    7    4    F    0    A    B
Binary:
           001100011001100010111110001100000001111110111101011101001111000010101011
6-Bit:
word:         00    49    38    11    56    48    07    59    53    52    60    10
Base64:       A     x     m     L     4     w     H     7     1     0     8
Map:       GGGGGGGGGGGGGGGGGGGGGGGGGGGGGGGGGGGGGGGGGG
Source:    5    5    3    9    0    9    0    0    4    0
Binary:    0101010100111001000010010000000001000000
6-Bit:
word:      45       21       14       16       36       00       16
Base64:    t        V        0        0        k        A        Q
Map:       GGGGGGGGGGGGGGGGGGGGGGGGGGGGGGGGGG
Source:    0    4    8    6    4    7    1    2    3    4
Binary:    00000100100001100100011100010010001101 00
6-Bit:
word:      00       18       07       17       49       08       52
Base64:    A        S        H        R        x        I        0
Result:
24byteSource: 82 87 65 38 40 31 98 BE 30 1F BD 74 F0 AB 55 39 09 00 40 04 86 47 12 34
Converts to 32 character Base 64 encoded string: godIOEAxrnL4wH7IO8KtVOQkAQASKRxIO
Map Legend:
A - Control Byte value represented as Binary Coded Decimal (BCD)
B - Sale Amount - 4 most significant digits represented as BCD
C - Sale Amount Truncation Field - single digit represented as BCD
D - Currency Code - 3 digits represented as binary
E - SHA-1 hash of Merchant Name ú First 7 bytes of SHA-1 hash value
F - MTS - 2 byte value
G - Issuer-defined Data - 10 bytes of issuer-defined data represented as BCD
```

13. The merchant hidden field data are stored in a database linking them at least to the issuer-defined data 810.
14. The database is made available to the issuer processor 108.
15. The issuer-defined data component 810 is combined with the system data component 808 to form a 24-byte binary value. The 24-byte binary value is Base 64 encoded to generate the 32 character 702.

Figure 3:
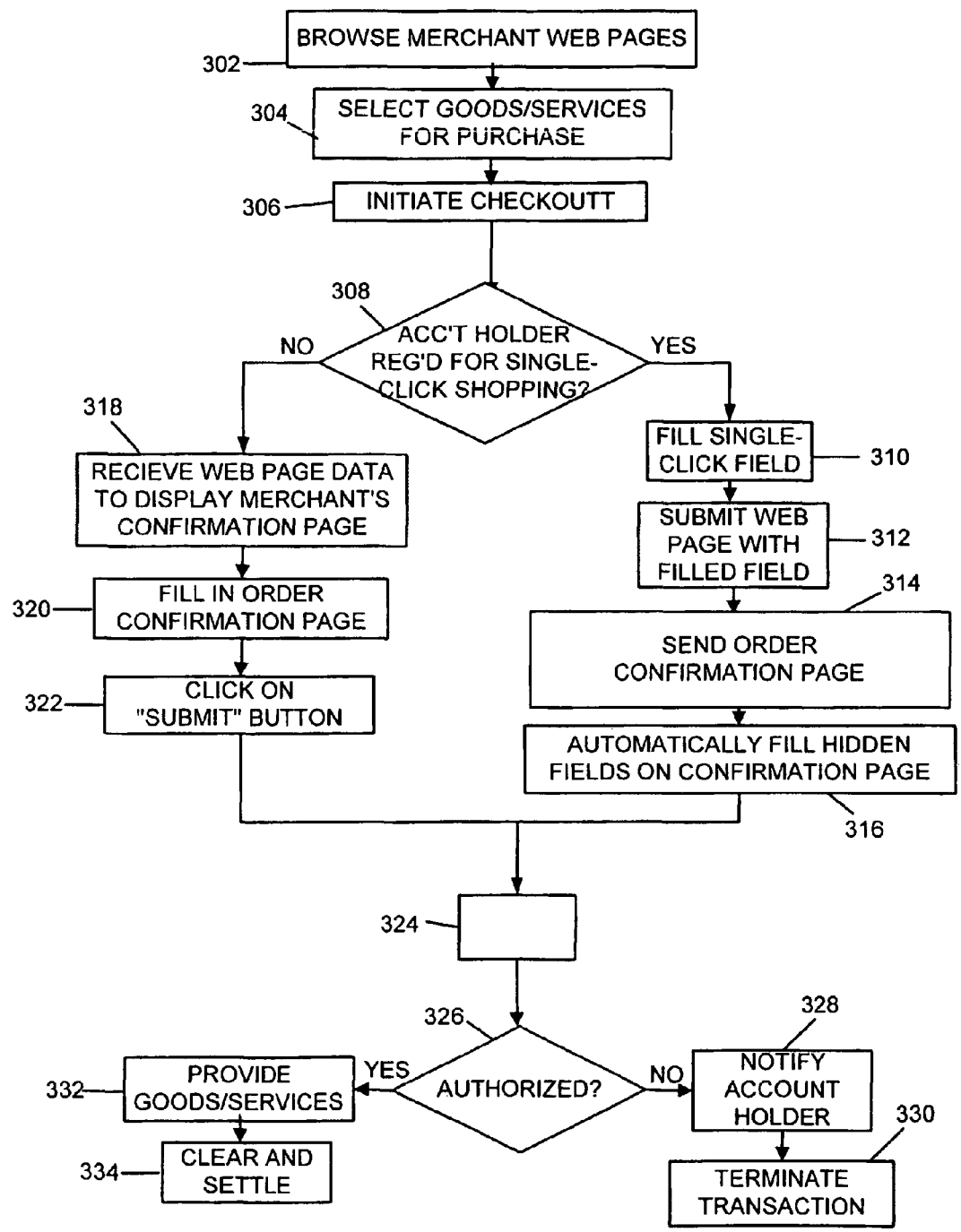
FIG. 3 is a flow diagram illustrating an exemplary procedure for conducting a payment transaction in accordance with the present invention.

FIG. 3 illustrates an exemplary procedure for operating the payment transaction system illustrated in FIG. 1 using authentication data 164 which includes the AAV 802 described above. In the illustrated procedure, the shopper (who, in many cases, is the account holder or a person related to or representing the account holder) browses the various pages of a Web site available from the merchant processor 104 (step 302). The shopper finds and selects goods and/or services that (s)he would like to purchase from the merchant (step 304). Once the goods and/or services have been selected, the shopper initiates the merchant's checkout procedure (step 306). For example, in the commonly used "shopping cart" method, the shopper selects goods and/or services to be placed in a virtual shopping cart—i.e., a list of items that the shopper tentatively plans to purchase. Once the list of items is completed to the satisfaction of the shopper, the shopper initiates checkout by clicking on a visible "checkout" button on the merchant's Web page, at which point the checkout procedure begins with respect to the items in the shopping cart. Another method employs a single-click checkout procedure in which the merchant processor 104 stores account holder information and then uses the information for multiple transactions. The stored information is provided by the account holder during a registration process and can include the account holder's billing and shipping addresses, e-mail address, account number, and account expiration date. The account holder can then immediately initiate checkout with respect to an item (step 306) by clicking on a visible "purchase" button associate with the item.

Once the checkout phase has been initiated (Step 306), if the account holder has not registered for single-click shopping (step 308), the merchant processor 104 provides the user processor 102 with additional Web page data through a portion 122 of the network 126 (step 318). The network 126 is typically the Internet. The Web page data is used to display a "checkout" Web page (a/k/a an "order confirmation" Web page) on the account holder's computer screen. The account holder and/or the user processor 102 provide(s) billing address, shipping address and/or payment account details to the merchant processor 104 by entering some or all of this information into fields on the confirmation page (step 320). The billing and shipping address information can be entered manually by the account holder, filled in automatically by the user processor 102, or filled in automatically by the merchant processor 104 based on information stored in the merchant processor 104 and associated with the particular account holder. To confirm the order, the account holder clicks a visible "submit" button on the confirmation page (step 322). The purchase is authorized using an authorization procedure 324 which utilizes the aforementioned technique of sending authentication data 164 from the authentication processor 114 to the user processor 102, to the merchant processor 104, to the acquirer processor 106, and then to the issuer processor 108 for verification. Examples of the authorization procedure 324 are described in further detail below with reference to FIGS. 4 and 5.

If, in step 308, it is determined that the account holder is registered for single-click shopping, the user processor 102 fills a "single-click" indicator field on the merchant's Web page with a code (e.g., "01") notifying the merchant processor 104 that the account holder is registered for single-click shopping (step 310). The Web page with the filled single-click indicator field is submitted to the merchant processor 104 (step 312). The merchant processor 104 sends confirmation page data to the user processor 102 (step 314). However, the purchaser only sees a page or window with a simple message such as, e.g., "Order Being Processed." While this message is being displayed, the user processor 102 automatically fills various hidden fields on the confirmation page with the account holder's address information and account number (step 316). The aforementioned authorization procedure 324 is then performed.

Regardless of whether the transaction is a single-click purchase, if authorization is granted by authorization procedure 324 (step 326), the good and/or services are shipped, delivered, or otherwise provided to the purchaser (step 332). Any conventional clearing and settlement procedure can be used to clear and settle payment between the payment account issuer and the merchant's acquirer (step 334). On the other hand, if authorization has been denied (step 326), then the account holder is notified of the denial (step 328), and the transaction is terminated (step 330).

Figure 4:
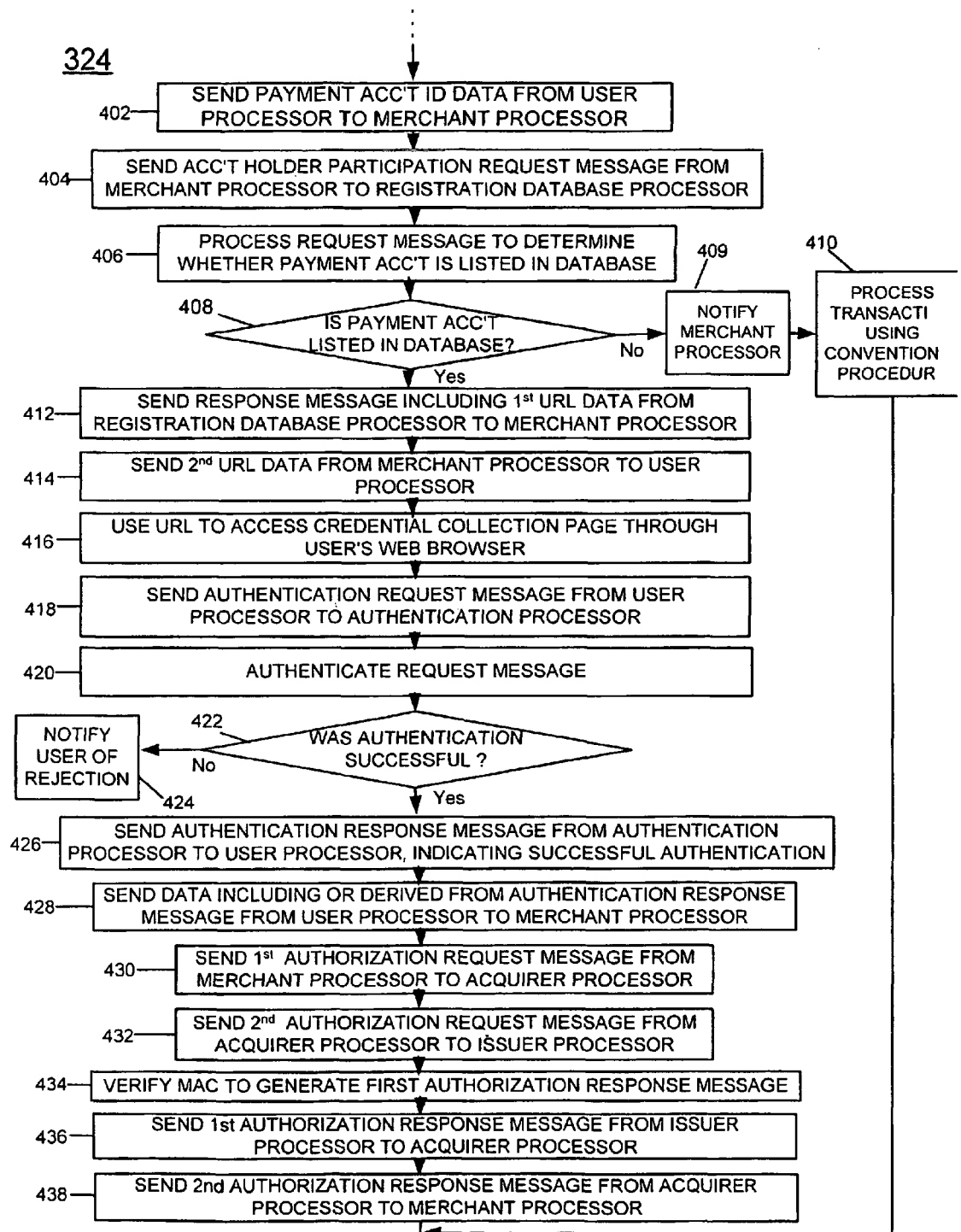
FIG. 4 is a flow diagram illustrating an exemplary authorization payment procedure for use in the procedure illustrated in FIG. 3.

An example of a procedure 324 for using the authentication data 164 to authorize a transaction is illustrated in FIG. 4. The user processor 102 sends payment account identification 152 data such as the account number to the merchant processor 104 (step 402). The data 152 is sent through a portion 122 of a network 126 which is typically the Internet. The payment account identification data 152 typically includes the account number associated with the payment account. The merchant processor 104 sends an account holder participation request message 154 to the registration database processor 110 (step 404). The registration database processor 110 includes, or otherwise has access to, a registration database which is preferably stored on a computer readable medium 116 within or connected to the registration database processor 110. As is discussed above, the registration database processor 110 can be incorporated into a payment organization processor 112 which further includes an authentication processor 114. The account holder participation request message 154 comprises either: (a) the payment account identification data 152 sent from the user processor 102 to the merchant processor 104, or (b) data derived from the payment account identification data 152. The account holder participation request message 154 is preferably sent through a portion 132 of the network 126. The registration database processor 110 processes the account holder participation request message 154 to determine whether the payment account indicated by the message 154 is listed in the registration database (step 406). If the indicated payment account is not listed in the database (step 408), the registration database processor 110 sends an account holder participation response message 156 to the merchant processor 104 notifying the merchant processor 104 of this result (step 409). The merchant processor 104 then processes the transaction using a conventional procedure (step 410). If, however, the payment account is listed in the registration database (step 408), the account holder participation response message 156 sent from the registration database processor 110 to the merchant processor 104 indicates that the payment account is listed, and includes first resource locator data (e.g., a URL) (step 412). The first resource locator data indicates a network address/location of a credential collection page. The credential collection page is preferably located within the payment organization processor 112. The merchant processor 104 sends second resource locator data 158 to the user processor 102 via the merchant Web page (step 414). The second resource locator data 158 are identical to or derived from the first resource locator data. The user processor 102 uses the second resource locator data 158 (e.g., the URL of the credential collection page) to access the credential collection page through the network 126 (e.g., through network portion 124) by receiving credential collection data 160 representing the credential collection page (step 416). The credential collection page is typically configured as a form which is filled in by the user processor 102 and then submitted as an authentication request message 162 sent from the user processor 102 to the authentication processor 114 (step 418). The credential information provided by the user processor 102 typically includes a user name, a password, an account number, and transaction details such as the merchant name and sale amount. The authentication processor 114 authenticates the authentication request message 162 (step 420). If the authentication is not successful (step 422), the authentication processor 114 sends to the user processor 102 an authentication response message 164 notifying the user processor 102 of the rejection (step 424). If, however, the authentication is successful (step 422), the authentication response message 164 sent from the authentication processor 114 to the user processor 102 indicates that the authentication was successful and includes authentication data such as the AAV described above (step 426). The user processor 102 then sends to the merchant processor 104 data 166 comprising or derived from the authentication response message 164 (step 428).

A first authorization request message 168 is sent from the merchant processor 104 to the acquirer processor 106, preferably through a network or network portion 128 (step 430). The first authorization request message 168 preferably includes either the AAV received by the merchant processor 104 in step 428 or a MAC extracted from this AAV. The acquirer processor 106 sends a second authorization request message 170 to the issuer processor 108, preferably through a network or network portion 130 (step 432). The second authorization request message 170 includes the aforementioned AAV or MAC. The issuer processor 108 verifies the MAC (step 434) to generate a first authorization response message 172 which is sent to the acquirer processor 106 through network/network portion 130 (step 436). The first authorization response message 172 indicates whether the verifying step (step 434) was successful. The acquirer processor 106 sends to the merchant processor 104—through network/network portion 128—a second authorization response message 174 comprising, or derived from, the first authorization response message 172 (step 438). As is discussed above with respect to the procedure illustrated in FIG. 3, the merchant processor 104 provides the requested goods and/or services (step 332) or notifies the account holder that authorization was denied (step 328), depending upon whether the verification step (step 434) was successful (step 326), as indicated by the second authorization response message 174.

The merchant processor 104 preferably captures and retains the AAV for future use in linking the account holder to a specific transaction. The data can also be used for performing subsequent authorizations of split-shipments, and may be of value to the merchant 404 during exception processing.

The merchant processor 104 ensures that it has not received a fraudulent AAV 802 by confirming that the most significant bit of the control byte 804 is a "1." This can be done by verifying that the left-most character of the Base 64 encoded AAV 802 is a lower case "g."

The Merchant Name is verified by confirming that the hash of the Merchant Name, as included in the AAV, exactly matches the hash of the Merchant Name that was included in one of the hidden fields. To accomplish this, the merchant processor 104 verifies that characters 7 through 16 of the Base 64 encoded AAV 802 exactly match a pre-computed value. This pre-computed value can be obtained by performing the SHA-1 hash process of the Merchant Name.

For example an AAV may be:
god1OEAxmL4wH7108KtVOQkAQASHRxI0

The merchant verification process would parse out characters 7-16:
AxmL4wH710

The merchant processor 104 compares this value to the known SHA-1 hash of the Merchant Name. If the value is not successfully validated, the merchant processor 104 declines the transaction.

Optionally, the merchant processor 104 can also validate the AAV sale amount based on the sale amount presented in one of the hidden fields. The merchant processor 104 converts the Base 64 encoded AAV 802 to its 24 binary byte source and identifies the Sale Amount, Sale Amount Truncation Field and Transaction Currency Code. The merchant processor 104 validates the Sale Amount, Sale Amount Truncation Field and Transaction Currency Code in accordance with the data descriptions in Table I and the Sale Amount and Currency Code presented via hidden fields. If the values are not successfully validated, then the merchant processor 104 declines the transaction.

Optionally, the merchant processor 104 can also validate the MTS contained in the AAV 802. When validating the MTS, the merchant processor 104 identifies the MTS component of the AAV 802 and compares it to the MTS presented in the order confirmation page hidden field. If the value is not successfully validated, the merchant processor 104 declines the transaction, because the AAV 802 is likely to be fraudulent.

The authorization request messages 168 and 170 preferably include at least the following data elements:
  Account holder's Payment Account Number supplied to the merchant
  Merchant Name
  Currency Code
  Sale Amount
  Merchant Transaction Stamp (default value is set to hexadecimal "00 00" by the merchant processor 104 if this element is not being used)

Optionally, the following data elements can also be included:
  Card Acceptor City
  Card Acceptor State/Country Because the authorization request messages 168 and 170 contain sensitive, transaction-specific data and may be transmitted over a public network such as the Internet, the authorization request messages 168 and 170 are preferably protected using a secure encryption method—e.g., 128-bit SSL or equivalent—in order to prevent the data from being compromised.

Figure 6:
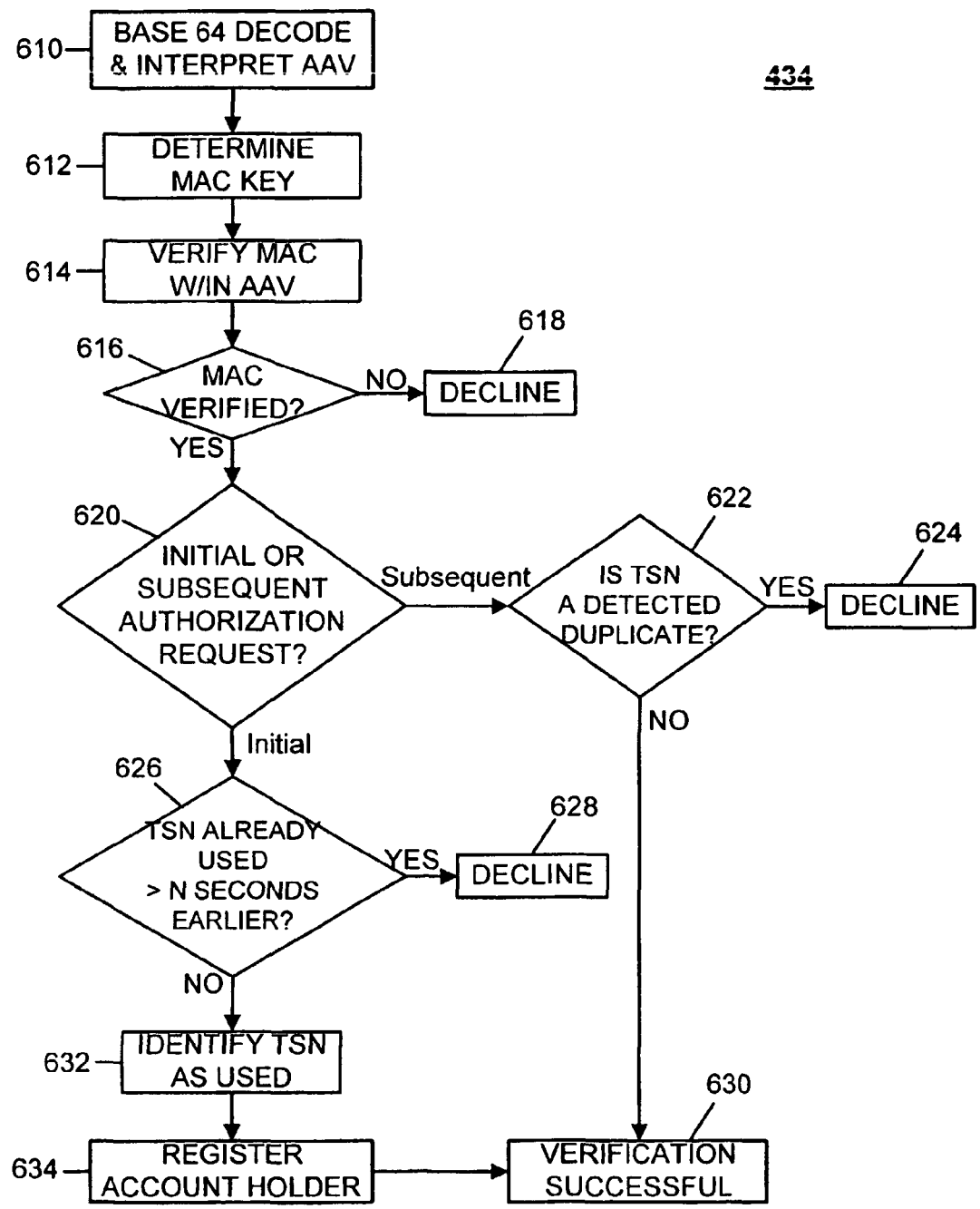
FIG. 6 is a flow diagram illustrating an exemplary authorization request message verification procedure for use in the authorization procedures illustrated in FIGS. 4 and 5.

FIG. 6 illustrates an exemplary procedure 434 for use by an issuer processor 108 processing an authorization request message 170 to generate an authorization response message 172 such as is discussed above with respect to FIGS. 1 and 4. The exemplary procedure 434 illustrated in FIG. 6 employs a cryptographic verification approach suitable for use with the cryptographically generated AAV 802 described above. In the illustrated procedure 434, the following steps are performed for each authorization request message 170 received by the issuer processor 108:

16. The AAV is extracted from the authorization request message, Base 64 decoded, and interpreted based on the indicated data format (step 610).

17. Using the AAV's Key Identification Data, its Authentication Processor Indicator, and its Transaction Sequence Number, the issuer processor 108 determines the cryptographic key to be used for MAC verification (step 612).
18. Using the appropriate MAC algorithm, the processor 108 attempts to verify the MAC within the AAV 802 (step 614). If the MAC is not successfully verified (step 616), the transaction is declined (step 618), because the AAV 802 is not valid and the transaction is therefore assumed to be fraudulent.
19. If the Control Byte of the AAV indicates that this is an initial authorization request (step 620):
    a. The processor 108 checks whether the same Transaction Sequence Number (from the authentication processor 114) and Sale Amount have already occurred in a previous initial authorization that was received more than "n" seconds ago (where "n" is to be specified by the issuer, and typically equals 60) (step 626). The optional delay of, e.g., 60 seconds is to allow for the automatic retransmission of an authorization request message if the corresponding authorization response message has been lost.
    b. If the Transaction Sequence Number has already occurred in a previous authorization-request message that was received more than "n" seconds ago (step 626), then the transaction is declined (step 628); this Transaction Sequence Number from this authentication processor 114 is a "detected duplicate." The attempted transaction involves a fraudulent replay of a previously valid AAV.
    c. If the Transaction Sequence Number has not already occurred (step 626), the AAV's Transaction Sequence Number is identified as "used" for future transactions (step 632).
    d. Optionally, after verifying the AAV 802 in this initial authorization request, the issuer 406 can check the registration status of the account holder and automatically register the account holder if the account holder is not already registered (step 634).
    e. The AAV is thus confirmed to be valid, and the transaction is therefore considered successfully verified (step 630). An indication of successful verification is included in the first authorization response message 172.
20. If the AAV's Control Byte 804 indicates that this is a subsequent authorization request (step 620), and if the AAV's Transaction Sequence Number is a "detected duplicate" for the authentication processor 114 being used (step 622), then the transaction is declined (step 624). This is a merchant-originated resubmission of an already replayed SPA transaction.
21. On the other hand, if the TSN is not a detected duplicate (step 622), then the AAV is valid, and the transaction is therefore considered successfully verified (step 630). An indication of successful verification is therefore included in the first authorization response message 172.

The issuer processor 108 preferably maintains a record of every account number that has been registered for performing AAV-based authentication. In addition, the issuer processor 108 stores the Key-Generation Key (or keys) that it shares with each authentication processor 114. The issuer processor 108 also stores records indicating which AAVs it has already received, in order to detect fraudulent replays of account numbers and their respective associated AAVs.

Figure 7:
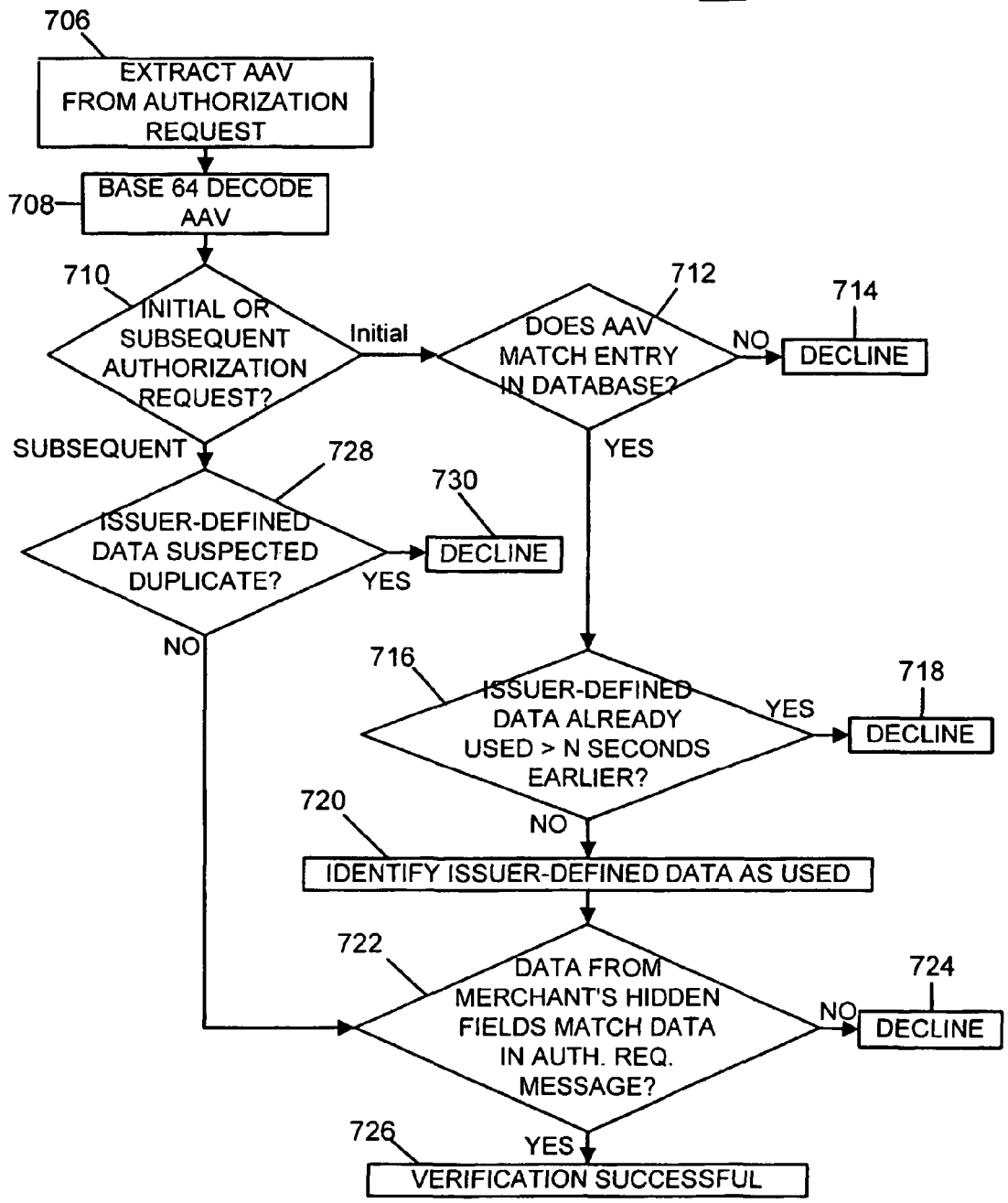
FIG. 7 is a flow diagram illustrating an additional exemplary authorization request message verification procedure for use in the authorization procedures illustrated in FIGS. 4 and 5.

AAV verification can also be performed using a comparative approach. For example, in the verification procedure 434 illustrated in FIG. 7, the issuer processor 108 performs the following steps for each authorization request message 170:
1. The issuer processor 108 extracts the AAV from the authorization request message 170 (step 706).
2. The AAV 802 of the authorization request message 170 is Base 64 decoded (step 708).
3. If the Control byte of the AAV indicates that this is an initial authorization request (step 710), the following AAV procedure is performed based on a comparison of AAV transaction information stored in the issuer's database with transaction data contained in the authorization request message 170:
    a. The issuer processor 108 verifies that the AAV received in the authorization request message 170 matches an entry in the issuer's database (step 712). If there is no matching entry (step 712), the transaction is declined (step 714).
    b. If the AAV received is determined to be valid based on a positive match (step 712), the issuer processor 108 verifies that the issuer-defined data 810 have not been received in a prior transaction. If the issuer-defined data 810 have been received in a prior transaction at any time—or, optionally, more than "n" seconds ago (where "n" typically equals 60)—(step 716), then the transaction is declined and the AAV 802 is labeled as a detected duplicate (step 718).
    c. If the issuer-defined data element has not been previously received (step 716) then the issuer-defined data 802 are labeled as "used" (step 720), and additional validation of the issuer-defined data 810 is performed (step 722).
    d. The additional data validation can include comparing data captured from the merchant hidden fields with data contained in the authorization request message 170 (step 722). This allows the issuer processor 108 to validate additional fields such as the Account Number and the Merchant Name. If the data are successfully validated (step 722), then the verification of the AAV 802 is considered successful (step 726). An indication of successful verification is therefore included in the authorization response message 172. If the data do not match (step 722), then the transaction is declined (step 724).
4. If, in step 710, the Control byte of the AAV indicates that this is a subsequent authorization request, the following steps are performed:
    a. If the issuer-defined data 810 are a "Suspected Duplicate" data set (step 728), the processor 108 declines the transaction (step 730).
    b. If the issuer-defined data 810 were received in an initial authorization and are not a "Suspected Duplicate" data set (step 728), then the processor 108 performs additional validation checks by comparing data captured from the merchant hidden fields with data contained in the authorization request message 170 (step 722). This allows the issuer 406 to validate the Account Number and Merchant Name. If the data match (step 722), then the verification is considered successful (step 726), and an indication of successful verification is therefore included in the authorization response message 172. Otherwise, the transaction is declined (step 724).

Optionally, the payment organization processor 112 can perform the verification procedure 434 on behalf of the issuer processor 108, in which case the second authorization request message 170 and the first authorization response message 172 are sent to and from the payment organization processor 112 rather than the issuer processor 108. In other words, the payment organization processor 112 can "stand in" for the issuer processor 108. Such "stand-in processing" can be especially beneficial if the issuer processor 108 is temporarily unavailable.

In any case, regardless of whether the verification procedure 434 has been performed by the issuer processor 108 or the payment organization processor 112, if the authorization response message 174 received by the merchant processor 104 indicates approval of the transaction (step 326 of FIG. 3), the merchant processor 104 preferably presents an HTML-based receipt page to the account holder in order to confirm completion of the transaction. This page preferably contains a reference number for use with customer inquiries. In addition, the receipt page hosts a hidden transaction identification field which is not visible to the account holder but which can be read by the user processor 102 for the purpose of identifying completed transactions. The goods are then shipped and/or the services are provided (step 332). Any conventional clearing and settlement procedure can then be used to clear and settle the payment between the issuer and the acquirer (step 334).

Figure 2:
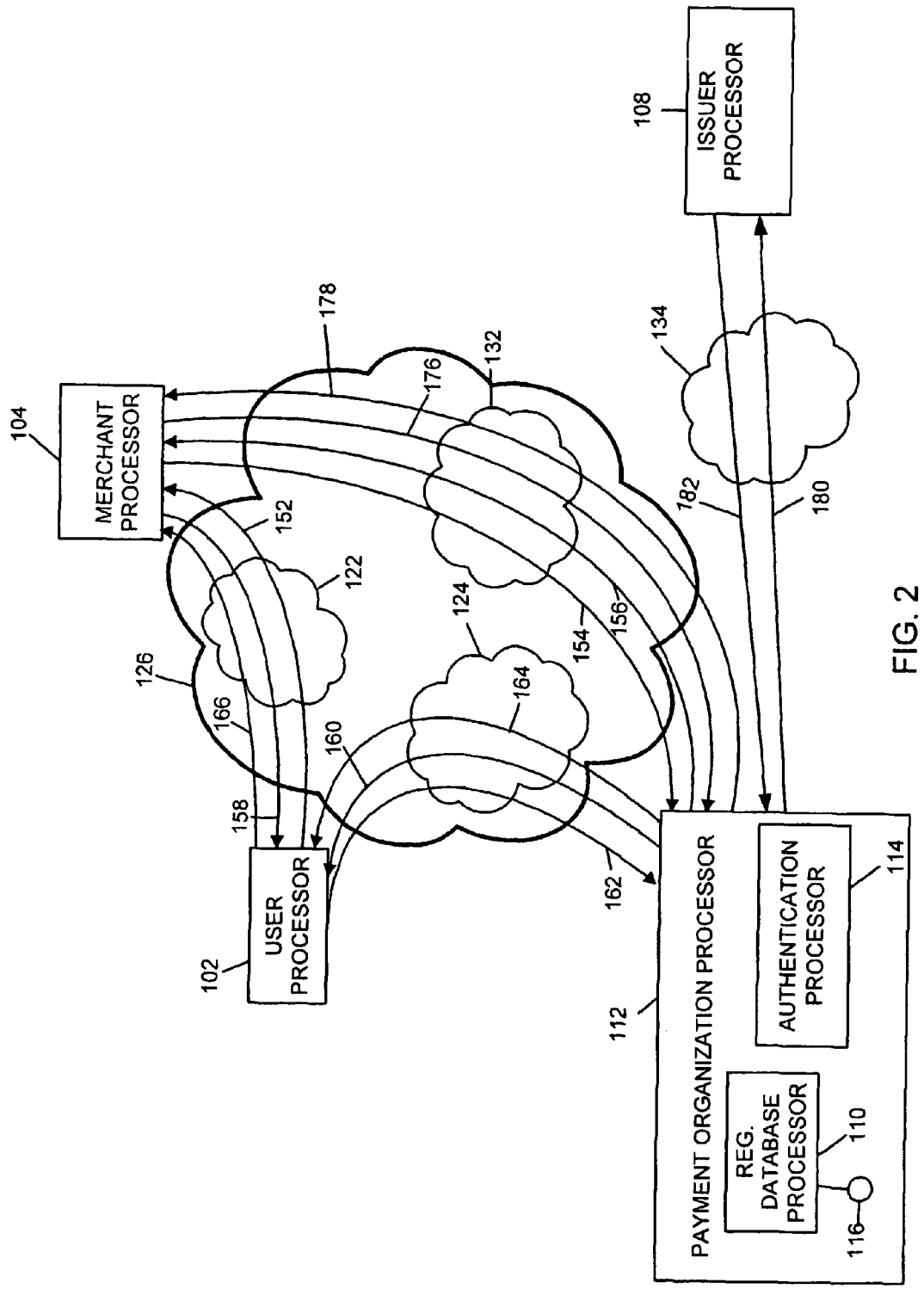
FIG. 2 is a block diagram illustrating an additional exemplary system for conducting a payment transaction in accordance with the present invention.

FIG. 2 illustrates an additional system for performing secure payment transactions in accordance with the present invention. Similarly to the system illustrated in FIG. 1, the system illustrated in FIG. 2 includes a user processor 102, a merchant processor 104, and an issuer processor 108. The system illustrated in FIG. 2 also includes a registration database processor 110 and an authentication processor 114, both of which are typically implemented as part of the software of a payment organization processor 112. However, the system illustrated in FIG. 2 typically does not include an acquirer processor 106. The system illustrated in FIG. 2 uses authentication data 164 which effectively travels from the authentication processor 114 to the user processor 102, then to the merchant processor 104, then to the payment organization processor 112, and then to the issuer processor 108 for verification.

Figure 5:
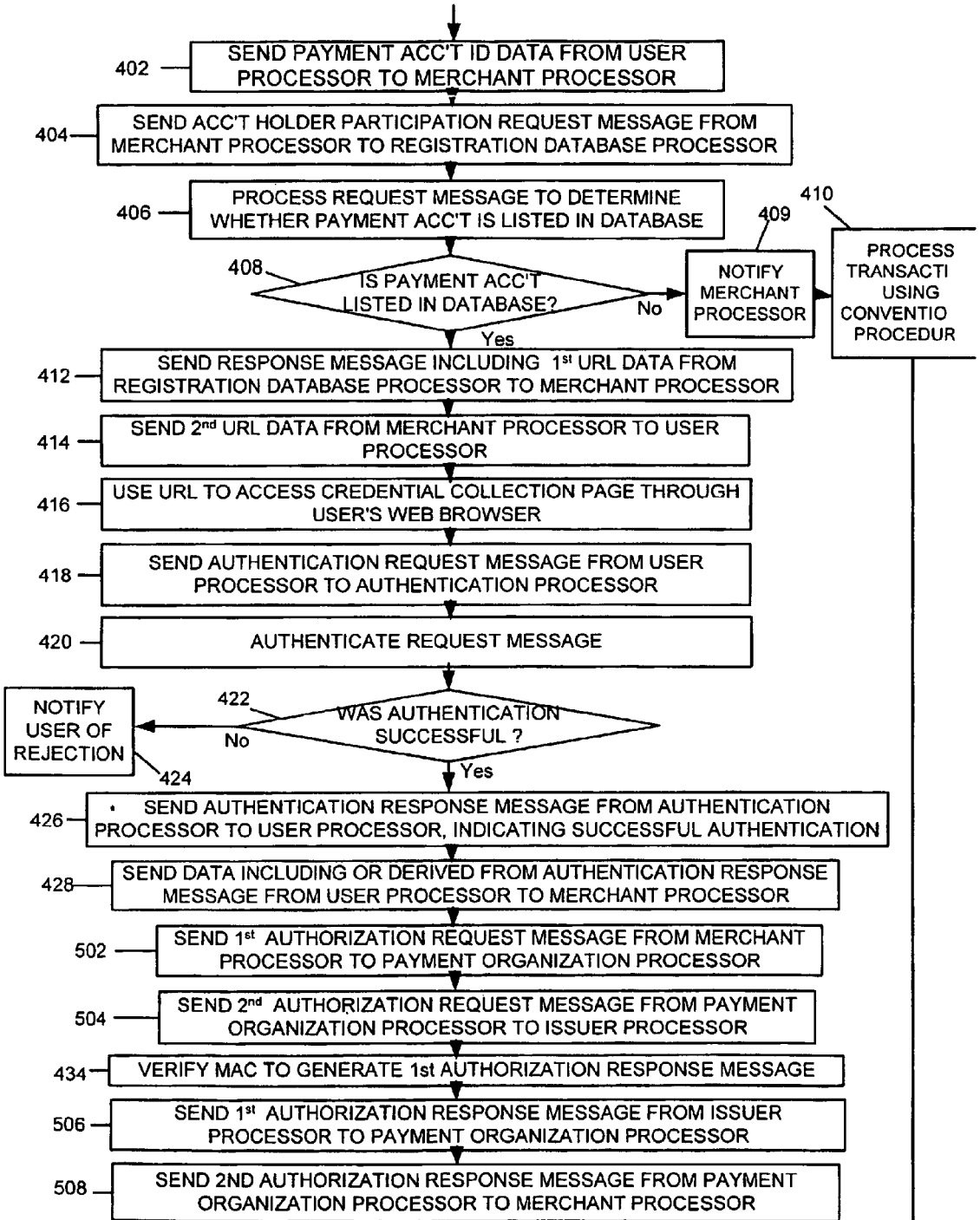
FIG. 5 is a flow diagram illustrating an additional exemplary authorization procedure for use in the procedure illustrated in FIG. 3.

Like the system illustrated in FIG. 1, the system illustrated in FIG. 2 can be operated using the procedure illustrated in FIG. 3. However, if the system illustrated in FIG. 2 is being used, the authorization step 324 preferably comprises the procedure illustrated in FIG. 5. Up to step 428, the procedure illustrated in FIG. 5 is identical to the procedure illustrated in FIG. 4, which is discussed in detail above. The further steps of the procedure illustrated in FIG. 5 are described as follows.

Upon receiving the data 166 comprising or derived from the authentication response message 164, the merchant processor 104 sends a first authorization request message 176 to the payment organization processor 112 through network portion 132 (step 502). The first authorization request message 176 includes the authentication data in the authentication response message, and/or data derived from the authentication data. For example, the first authorization request message 176 preferably includes an AAV or a MAC extracted from the AAV, as is discussed above with respect to the procedure illustrated in FIG. 4. The payment organization processor 112 sends a second authorization request message 180 to the issuer processor 108 through a network or network portion 134 (step 504). The second authorization request message 180 is equal to or derived from the first authorization request message 176 and preferably includes the MAC. The issuer processor 108 verifies the second authorization request message 180—typically by verifying the AAV or the MAC as is discussed above with respect to FIGS. 6 and 7—to generate a first authorization response message 182 (step 434), which is sent from the issuer processor 108 to the payment organization processor 112 through network/network portion 134 (step 506). The first authorization response message 182 indicates whether the verification (step 434) was successful. The payment organization processor 112 sends to the merchant processor 104 a second authorization response message 178 which is identical to or derived from the first authorization response message 182 (step 508). Depending upon the result of the verification (see step 326 illustrated in FIG. 3), the transaction is completed (steps 332 and 334) or terminated (steps 328 and 330), as is discussed above with respect to FIG. 3.

Optionally, the payment organization processor 112 can perform the verification procedure 434 on behalf of the issuer processor 108, as is discussed above with respect to the system illustrated in FIG. 1. If such stand-in processing is performed by the payment organization processor 112, then the payment organization processor 112 verifies authorization request message 176 to generate authorization response message 178.

Preferably, the account holder registers with the issuer before being allowed to conduct AAV-based transactions.

The registration process provides the following beneficial features:
  Strong authentication of the account holder
  Account holder registration with the issuer To register with the issuer, the account holder first accesses the issuer's online banking Web site which is accessible from the issuer's Web server. Optionally, this server can be the issuer processor 108. If the account holder has already registered for access to the issuer's online banking site, the account holder logs in using his/her existing access credentials. These credentials are verified using any conventional online banking account holder authentication method.

If the account holder has not yet registered for access to the issuer's online banking site, the issuer's Web server—e.g., the issuer processor 108—requires the account holder to register. Preferably, the server strongly authenticates the identity of the account holder before and/or during registration, in order to ensure the security of subsequent transactions performed using the payment account. Once the account holder has been successfully authenticated, the registration process proceeds with account holder profile initialization. The account holder is presented with an option to continue registering. Selection of the continued registration option navigates the account holder's Web browser to a registration page. This page presents the account holder with a list of accounts that can be registered, and requests certain information from the account holder in order to set up the account holder's profile within the issuer processor 108. The information preferably includes at least the following:
  Account Number
  Account Expiration Date
  Account CVC2 Verification Value The following additional information can also be collected during profile initialization:
  Account Holder Name
  Account Holder Billing Address
  Account Holder Shipping Address Optionally, the issuer can automate the profile set-up based on account holder information which is available from the issuer's online banking site. Automating some or all of the set-up process makes it unnecessary for the account holder to re-enter this information, thus providing the account holder with a more convenient registration experience.

The data collected from the account holder or from the automated interface are stored in the issuer processor 108 as part of the account holder's registration request. For systems in which the processor performing the verifications is operated by an organization other than the issuer, the request and its resulting response should be adequately protected during transmission between organizations. For example, the security of the request and response can be ensured by sending these messages over a protected, private network connection, or by encrypting the message prior to transmission over a public network such as the Internet. The issuer's server processes the registration request and responds with either: (a) a confirmation that the registration was completed successfully; or (b) an indication that the registration failed, along with a message explaining the reason for the failure.

Issuers should select a strong authentication mechanism that will ensure that the account holder being registered can be properly identified and validated. In particular, when issuers implement the registration process, they should keep the following guidelines/preferences in mind when identifying shared secrets that can be used for authentication purposes:

Multiple pieces of information, rather than just one piece, should be used for the shared secret. For example, the account holder's mother's maiden name and the last four digits of his/her social security number can be used in combination with an issuer-generated password.

The shared secret should be verifiable. For example, if the account holder's mother's maiden name is to be used, the authorization system should be able to verify this information.

It should be difficult or impossible to discover the entire shared secret without access to multiple sources. It is preferable to avoid using a shared secret that is available completely within one document and/or from public information. For example, should the issuer choose to use credit line and address information, both pieces of this shared secret are available on the account holder's monthly account statement. If the statement is intercepted, then the shared secret will be compromised.

The issuer can optionally use several pieces of information to determine the shared secret. For example, the following information can be used:
 A bank-generated password sent to the billing address of the account holder in a mailer which is separate from the statement.
 A CVC2 which is only available on the signature panel of card.
 A verifiable non-public number such as the last four digits of the account holder's social security number.
 The Credit Line on the account (available on the monthly account statement).

The account holder's access credentials—which are used to authenticate the account holder's identity during purchase transactions—are typically stored and managed by the issuer processor 108 and preferably include some or all of the following:
 UserID/password
 Smart card/PIN
 Password released wallet secret
 Biometric verification
 Digital certificate(s)
 Any other secure, issuer-approved authentication mechanism In order to maximize cardholder security and provide strong cardholder authentication, the issuer processor 108 preferably authenticates each transaction.

Optionally, the issuer processor 108 can store data that tracks AAV generation and account holder transactions. Tracking the history of AAV generation, including the Card City, the Card State/Country, the Brand, and the AAV itself, can be of assistance to the issuer in supporting dispute management and chargeback processes. In addition, the issuer can challenge account holder repudiation based on its records of authentication events and account holder confirmations of transactions. Such a challenge is typically based on the AAV, Card City, Card State/Country and Brand associated with each transaction. The issuer can also choose to make the history of transactions available online to the account holder, thereby reducing the number of customer service inquires.

In the case of a purchase involving a split shipment, the merchant processor 104 preferably requests and obtains authorization for each part of the shipment. When processing a subsequent authorization due to a split shipment, the merchant processor 104 modifies the Control Byte 804 contained on the initial authorization AAV 802 from hexadecimal "82" to hexadecimal "02." Failure to modify the Control Byte 804 for a subsequent authorization will result in a decline of authorization by the issuer processor 108.

Optionally, the merchant processor 104 can re-transmit an authorization request after an initial issuer decline. If so, the AAV 802 is transmitted as a subsequent authorization with the Control Byte 804 modified from hexadecimal "82" to hexadecimal "02."

In some cases, the merchant processor 104 may generate, for a given transaction, a second authorization request having an AAV with the same value as the AAV in the original request. The second authorization request may not be bit-wise identical to the original request. For example, the requests might have different system-trace ID numbers. The merchant processor 104 would typically generate a second authorization request if:
 The merchant processor 104 does not receive a response to the original authorization request within a pre-determined time-out period; or
 The merchant fully reverses the original authorization, but later decides to re-instate it.

The merchant processor 104 preferably treats such authorization requests as subsequent authorization requests by flipping the most significant bit of the control byte 804. This will prevent such requests from being erroneously rejected by the issuer processor 108 as possible replay attacks.

It will be appreciated by those skilled in the art that the methods and systems illustrated in FIGS. 1-8 can be implemented on various standard computer platforms operating under the control of suitable software defined by FIGS. 1-8. In some cases, dedicated computer hardware, such as a peripheral card in a conventional personal computer, can enhance the operational efficiency of the above methods.

Figure 9:
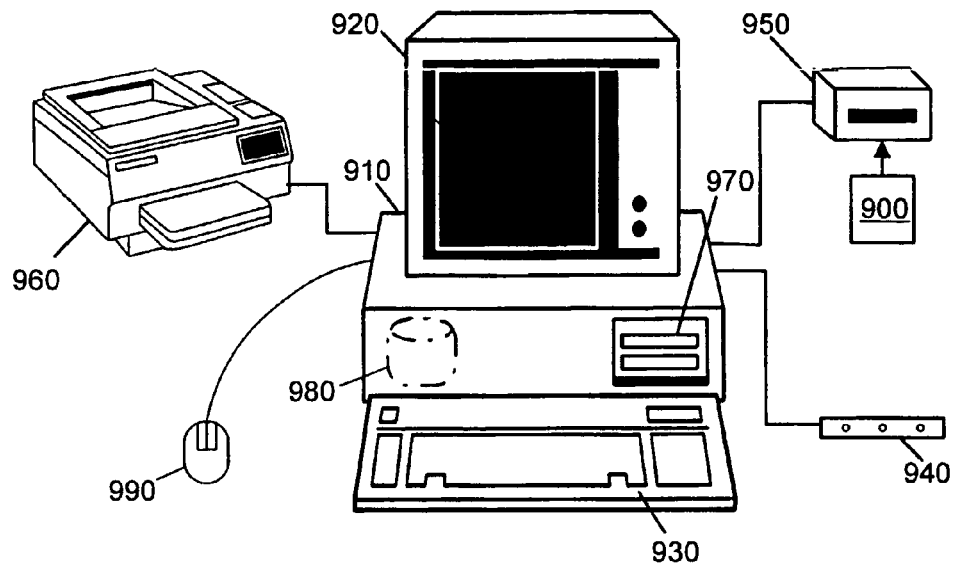
FIG. 9 is a diagram illustrating an exemplary computer system for performing the procedures illustrated in FIGS. 3-7.
Figure 10:
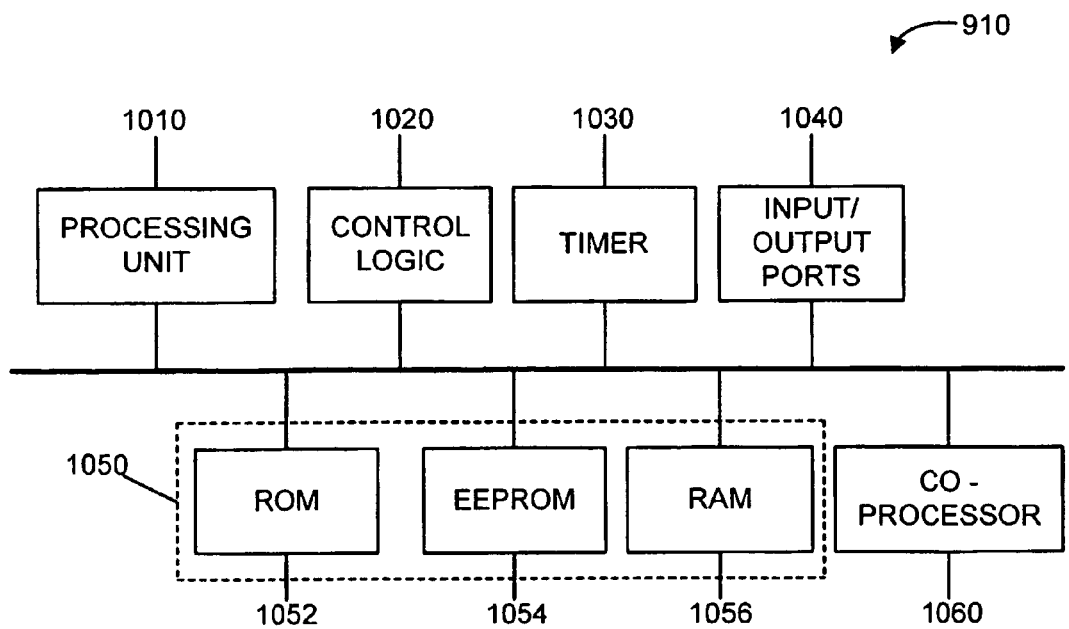
FIG. 10 is a block diagram illustrating an exemplary processing section for use in the computer system illustrated in FIG. 9.

FIGS. 9 and 10 illustrate typical computer hardware suitable for practicing the present invention. Referring to FIG. 9, the computer system includes a processing section 910, a display 920, a keyboard 930, and a communications peripheral device 940 such as a modem. The system can also include a printer 960. The computer system typically includes one or more disk drives 970 which can read and write to computer-readable media such as magnetic media (i.e., diskettes) and/or optical media (e.g., CD-ROMS or DVDs), for storing data and application software. The system also typically includes an internal computer-readable medium 980 such as a hard disk drive. Other input devices, such as a digital pointer 990 (e.g., a "mouse") and a card reader 950 for reading a payment card 900 can also be included. Computer hardware such as is illustrated in FIGS. 9 and 10 can be used to run the software illustrated in FIGS. 3-7, and/or can be used to perform the functions of the user processor 102, the merchant processor 104, the acquirer processor 106, the payment organization processor 112, the authentication processor 114, the registration database processor 110, and/or the issuer processor 108.

FIG. 10 is a functional block diagram which further illustrates the processing section 910. The processing section 910 generally includes a processing unit 1010, control logic 1020 and a memory unit 1050. Preferably, the processing section 910 can also include a timer 1030 and input/output ports 1040. The processing section 910 can also include a co-processor 1060, depending on the microprocessor used in the processing unit. Control logic 1020 provides, in conjunction with processing unit 1010, the control necessary to handle communications between memory unit 1050 and input/output ports 1040. Timer 1030 provides a timing reference signal for processing unit 1010 and control logic 1020. Co-processor 1060 provides an enhanced ability to perform complex computations in real time, such as those required by cryptographic algorithms.

Memory unit 1050 can include different types of memory, such as volatile and non-volatile memory and read-only and programmable memory. For example, as shown in FIG. 10, memory unit 1050 can include read-only memory (ROM) 1052, electrically erasable programmable read-only memory (EEPROM) 1054, and random-access memory (RAM) 1056. Different computer processors, memory configurations, data structures and the like can be used to practice the present invention, and the invention is not limited to a specific platform. For example, although the processing section 910 is illustrated in FIGS. 9 and 10 as part of a computer system, the processing section 910 and/or its components can be incorporated into a PDA or a mobile telephone.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

We claim:

1. A method for conducting a payment transaction using payment account identification data associated with a payment account, the method comprising:
   a. receiving identification data at a merchant processor from a purchaser processor;
   b. transmitting said identification data from said merchant processor to a registration database processor; and
   c. receiving at said merchant processor data from said registration database processor, said data including the address of a credential collection page, said address accessible via a standard internet browser;
   d. transmitting said address from said merchant processor to said purchaser processor;
   e. receiving at said merchant processor from said purchaser processor first authentication data generated by an authentication processor in response to said purchaser processor accessing said address; and
   f. transmitting a first authorization request message, said first authorization request message comprising second authentication data based on said first authentication data and a transaction amount from said merchant processor, to at least one of an acquirer processor and a payment organization processor over a payment network.

2. The method of claim 1, wherein said payment network is not publicly accessible.

3. The method of claim 1, wherein said second authentication data is said first authentication data.

4. A method according to claim 1, wherein receiving data from said registration database processor at said merchant processor further comprises:
   receiving an account holder participation response message, the account holder participation response message comprising first resource locator data, the first resource locator data indicating a network location of credential collection data, the credential collection data being accessible through a public network.

5. A method according to claim 4, further comprising:
   sending second resource locator data from the merchant processor to the purchaser processor, said second resource locator data comprising at least one of the first resource locator data and data derived from the first resource locator data,
   wherein said second resource locator data can be used to access the credential collection data through the network, further wherein said credential collection data can be used to send an authentication request message to the authentication processor.

6. A method according to claim 1, wherein said first authorization request message is transmitted from said merchant processor to said acquirer processor, the method further comprising:
   receiving a verification success authorization response message at the merchant processor from the acquirer processor, the verification success authorization response message based on a second authorization request sent from said acquirer processor to an issuer processor.

7. A method according to claim 6, further comprising:
   allowing a customer a benefit of at least one of a good and a service if said verification success authorization response message indicates a successful verification of said second authorization data.

8. A method according to claim 1, wherein said first authorization request message is transmitted from said merchant processor to said payment organization processor, further comprising:
   receiving a verification success authorization response message from the payment organization processor, the verification success authorization response message based on a second authorization request sent from said payment organization processor to an issuer processor.

9. A method according to claim 8, further comprising
   allowing a customer a benefit of at least one of a good and a service if said verification success authorization response message indicates a successful verification of said second authentication data.

10. A system for conducting a payment transaction using payment account identification data associated with a payment account, the system comprising a merchant processing arrangement configured to perform the steps of:
    a. receiving identification data from a purchaser processor;
    b. transmitting said identification data to a registration database processor;
    c. receiving data from said registration database processor, said data including the address of a credential collection page, said address accessible via a standard internet browser running on said purchaser processor;
    d. transmitting said address to said purchaser processor;
    e. receiving from said purchaser processor first authentication data generated by an authentication processor in response to said purchaser processor accessing said address; and
    f. transmitting a first authorization request message, said first authorization request message comprising second authentication data based on said first authentication data and a transaction amount to at least one of an acquirer processor and a payment organization processor over a payment network.

11. A system according to claim 10, wherein said payment network is not publicly accessible.

12. A system according to claim 10, wherein said second authentication data is said first authentication data.

13. A system according to claim 10, wherein the merchant processing arrangement is further configured to perform the steps of:
  receiving an account holder participation response message, the account holder participation response message comprising first resource locator data, the first resource locator data indicating a network location of credential collection data, said credential collection data being accessible through a public network.

14. A system according to claim 13, wherein the merchant processing arrangement is further configured to perform the steps of:
  sending second resource locator data to the purchaser processor, said second resource locator data comprising at least one of the first resource locator data and data derived from the first resource locator data,
  wherein said second resource locator data can be used to access the credential collection data through the network, further wherein said credential collection data can be used to send an authentication request message to the authentication processor.

15. A system according to claim 10, wherein the merchant processing arrangement is configured to transmit said first authorization request message to said acquirer processor and further configured to:
  receive a verification success authorization response message from said acquirer processor, the verification success authorization response message based on a second authorization request sent from said acquirer processor to an issuer processor.

16. A system according to claim 15, wherein the merchant processing arrangement is further configured to:
  allow a customer access to at least one of a good and a service if said verification success authorization response message indicates a successful verification of the second authentication data.

17. A system according to claim 10, wherein the merchant processing arrangement is configured to transmit said first authorization request message to said payment organization processor, the merchant processing arrangement further configured to:
  receive a verification success authorization response message from said payment organization processor, the verification success authorization response message based on a second authorization request sent from said payment organization processor to an issuer processor.

18. A system according to claim 17, wherein the merchant processing arrangement is further configured to:
  allow a customer access to at least one of a good and a service if said verification success authorization response message indicates a successful verification of the second authentication data.

* * * * *